US010516653B2

(12) United States Patent
Deriso

(10) Patent No.: US 10,516,653 B2
(45) Date of Patent: Dec. 24, 2019

(54) PUBLIC KEY PINNING FOR PRIVATE NETWORKS

(71) Applicant: AirWatch LLC, Atlanta, GA (US)

(72) Inventor: Jonathon Deriso, Suwanee, GA (US)

(73) Assignee: AirWatch, LLC, Atlanta, GA (US)

( * ) Notice: Subject to any disclaimer, the term of this patent is extended or adjusted under 35 U.S.C. 154(b) by 438 days.

(21) Appl. No.: 15/196,763

(22) Filed: Jun. 29, 2016

(65) Prior Publication Data
US 2018/0007021 A1 Jan. 4, 2018

(51) Int. Cl.
H04L 29/06 (2006.01)
H04L 9/32 (2006.01)

(52) U.S. Cl.
CPC ........ *H04L 63/0442* (2013.01); *H04L 9/3242* (2013.01); *H04L 9/3247* (2013.01); *H04L 9/3263* (2013.01); *H04L 63/0823* (2013.01); *H04L 63/0876* (2013.01); *H04L 63/126* (2013.01); *H04L 63/166* (2013.01)

(58) Field of Classification Search
CPC ............... H04L 63/0442; H04L 9/3242; H04L 63/0823; H04L 63/0876; H04L 63/126
USPC .......................................................... 713/156
See application file for complete search history.

(56) References Cited

U.S. PATENT DOCUMENTS

| 6,088,805 | A * | 7/2000 | Davis ...................... G06F 21/33 726/10 |
| 9,231,925 | B1 | 1/2016 | Lundstrom |
| 9,774,590 | B1 | 9/2017 | Bronshtein et al. |
| 9,888,037 | B1 * | 2/2018 | Sharifi Mehr .......... H04L 63/18 |
| 2004/0030887 | A1 * | 2/2004 | Harrisville-Wolff ........................ H04L 63/0442 713/155 |
| 2006/0005237 | A1 * | 1/2006 | Kobata ................ H04L 63/0823 726/12 |
| 2009/0126001 | A1 * | 5/2009 | Krantz .................... G06F 21/33 726/10 |
| 2010/0306533 | A1 | 12/2010 | Phatak |
| 2010/0306816 | A1 * | 12/2010 | McGrew ................. H04L 63/08 726/1 |
| 2011/0072507 | A1 | 3/2011 | Johnston et al. |

(Continued)

OTHER PUBLICATIONS

International Search Report mailed for Application No. PCT/US2018/032796.

(Continued)

*Primary Examiner* — Lisa C Lewis
*Assistant Examiner* — Thanh T Le
(74) *Attorney, Agent, or Firm* — Thomas Horstemeyer, LLP

(57) ABSTRACT

Disclosed are various approaches for validating public keys pinned to services or servers on private networks. A client device can request a first certificate from a trust service. The client device can then validate that the first certificate from the trust service is signed by a preinstalled certificate stored on the client device. Subsequently, the client device can receive a uniform resource locator identifying a network location of an secure sockets layer (SSL) pinning service, wherein the SSL pinning service is configured to provide a hash value for a first public key issued to a computing device. Finally, the client device can receive a second public key from the trust service, wherein the second public key is configured to encrypt network traffic sent to the SSL pinning service.

20 Claims, 3 Drawing Sheets

(56) References Cited

U.S. PATENT DOCUMENTS

| | | | | |
|---|---|---|---|---|
| 2012/0170753 | A1* | 7/2012 | Pandrangi | G06F 21/6209 380/286 |
| 2013/0166899 | A1* | 6/2013 | Courtney | G06F 21/53 713/100 |
| 2013/0267199 | A1* | 10/2013 | Kamal | H04L 63/0853 455/410 |
| 2013/0305333 | A1* | 11/2013 | Katzer | G06F 21/6245 726/7 |
| 2014/0228001 | A1* | 8/2014 | Kulkarni | H04L 63/10 455/411 |
| 2014/0282925 | A1* | 9/2014 | Walsh | H04L 63/0853 726/5 |
| 2015/0128205 | A1 | 5/2015 | Mahaffey et al. | |
| 2015/0334094 | A1* | 11/2015 | Suresh | H04L 63/0471 713/153 |
| 2015/0373048 | A1* | 12/2015 | Siddiqui | H04W 12/08 713/151 |
| 2016/0043867 | A1 | 2/2016 | Bonsignore | |
| 2016/0065567 | A1* | 3/2016 | Aggarwal | H04L 63/0823 713/175 |
| 2016/0080157 | A1 | 3/2016 | Lundstrom | |
| 2016/0149898 | A1 | 5/2016 | Pada et al. | |
| 2016/0248590 | A1 | 8/2016 | Benson | |
| 2016/0316025 | A1 | 10/2016 | Lloyd et al. | |
| 2017/0054708 | A1* | 2/2017 | Zaw | H04L 63/0823 |
| 2017/0070486 | A1* | 3/2017 | Lyons | H04L 63/0442 |
| 2017/0078328 | A1 | 3/2017 | McGinnity et al. | |
| 2017/0126664 | A1* | 5/2017 | Khandelwal | H04L 63/0823 |
| 2017/0230355 | A1* | 8/2017 | Su | H04L 63/0823 |
| 2017/0250979 | A1 | 8/2017 | Benson et al. | |
| 2017/0257360 | A1* | 9/2017 | Gattu | H04L 63/0823 |
| 2017/0279619 | A1 | 9/2017 | Yang | |
| 2017/0289137 | A1* | 10/2017 | Pendarakis | H04L 63/0823 |
| 2017/0339130 | A1 | 11/2017 | Reddy et al. | |
| 2017/0346853 | A1 | 11/2017 | Wyatt et al. | |
| 2018/0123795 | A1 | 5/2018 | Norman et al. | |
| 2018/0288036 | A1* | 10/2018 | Bender | H04L 63/0823 |

OTHER PUBLICATIONS

Office Action dated Dec. 13, 2018 for U.S. Appl. No. 15/595,254.
Office Action dated for U.S. Appl. No. 15/595,254.

* cited by examiner

PUBLIC KEY PINNING FOR PRIVATE NETWORKS

BACKGROUND

Network applications often use a version of the secure sockets layer (SSL) or transport layer security (TLS) protocols to secure communications between computing devices, such as between a client and a server or between two servers. The SSL and TLS protocols typically provide both authentication and encryption functionality in order for the computing devices to verify each other's identity and for the computing devices to encrypt communications between each other. These functions are typically implemented through the use of certificates issued to one or more of the computing devices in communication with each other.

For example, a server can be issued a certificate from a certificate authority. The certificate will typically include information identifying the owner of the server, the identity of the owner of the certificate authority that issued the certificate, and additional information instructing client devices how to encrypt network traffic sent to the server. When a client attempts a secure communication with the server, the server will provide the certificate to the client. The client will then verify that the certificate was issued by the certificate authority. If the certificate authority is included in a list of trusted certificate authorities maintained by the client, the client will secure communications with the server using the encryption instructions included in the certificate. Typically, client devices will have a preinstalled list of trusted certificate authorities (e.g., a list bundled with the operating system, list bundled with a web browser, or a list bundled with some other client application), although individual certificate authorities can often be manually added to the list of trusted certificate authorities.

As a result, a client does not have to store or otherwise track certificate information for every server that the client can potentially communicate with. Instead, the client can track information pertaining to a smaller number of trusted certificate authorities that issue certificates. So long as the certificate of a server has been issued by one of these trusted certificate authorities, the client will be able to securely communicate with the server using a version of the SSL or TLS protocol.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
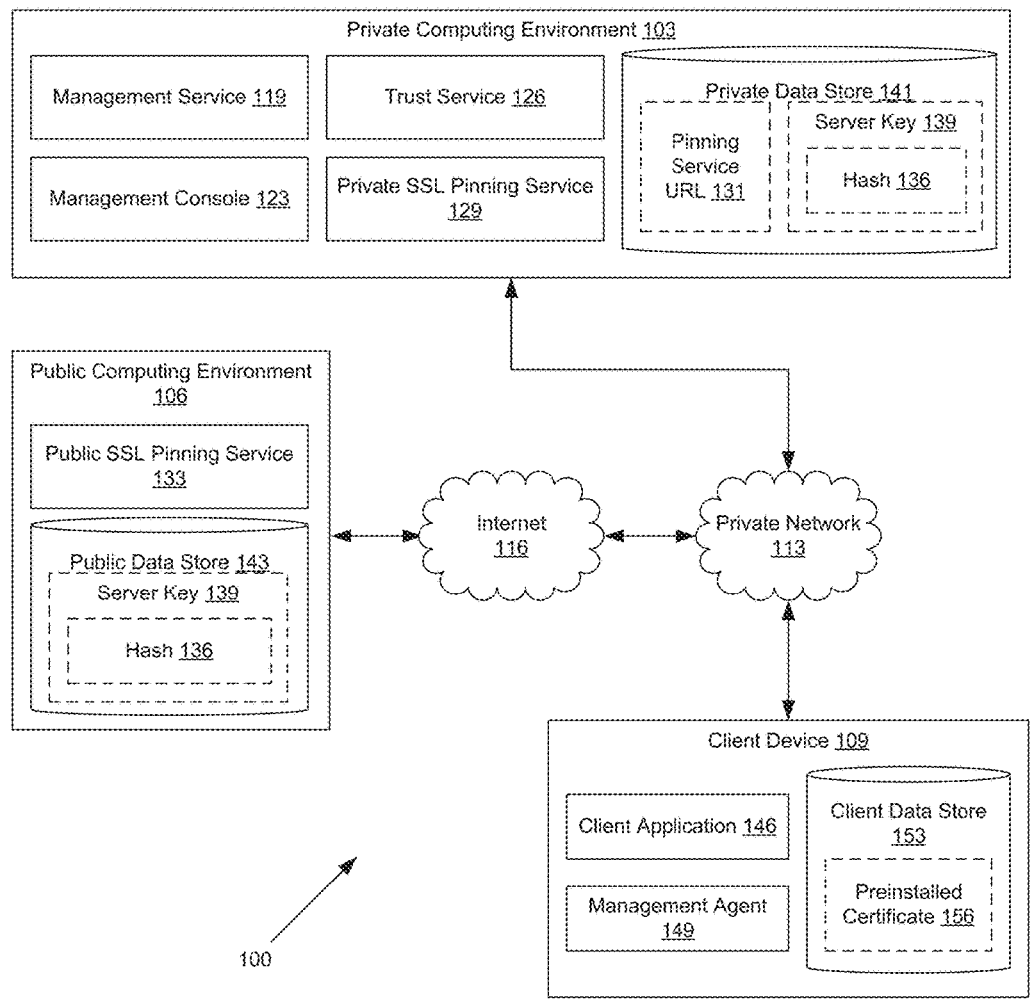
FIG. 1 is network diagram depicting an example networked environment.

Disclosed are various examples for providing certificate pinning services on a private network. Certificate pinning is a technique for mitigating "man-in-the-middle" (MITM) attacks on communications between two computing devices (e.g., a client and a server or between two servers) that are secured using a version of the SSL or TLS protocol.

In a typical MITM attack on an unencrypted network connection, a third-party will intercept all network traffic sent between two computing devices, record and/or modify the intercepted network traffic, and relay the intercepted network traffic to the other computing device. In an example implementation of the attack, the third-party will represent itself to the client device as the server. Likewise, the third-party would represent itself to the server as the client device. Accordingly, the client device would then send a request to the third-party that was intended for the server. The third-party would record the request from the client and then forward the request to the server. The server would then send a reply to the third-party that was intended for the client. The third-party would then record the reply from the server and then forward the reply to the client. The third-party could also manipulate or otherwise change the request and reply in any manner desired.

To prevent a MITM attack, the client and the server can agree to communicate using a version of the SSL or TLS protocol. Using the SSL or TLS protocol, the client and the server will first verify each other's identities. For example, the server will present a certificate to the client that identifies the server. The certificate can include information that identifies the owner of the server and information regarding the certificate authority that issued or generated the certificate. If the certificate authority is included in a list of trusted certificate authorities, then the client will assume that the server is owned or operated by the party identified in the certificate. The client and the server will then encrypt each packet sent to the other, rendering any intercepted network traffic unreadable and unmodifiable.

However, the third-party can attempt to circumvent the SSL or TLS protocol by relying on a forged or fraudulently generated certificate. These certificates can be forged or fraudulently generated through a number of approaches. In a simple example, the third-party could hack or otherwise gain control of a certificate authority trusted by the client. The third-party could then use the hacked certificate authority to generate unauthorized certificates on behalf of the server that would be trusted by the client. This would allow the third-party to impersonate the server. Accordingly, the third-party could decrypt network traffic sent from the client to the server, re-encrypt the network traffic and then forward it to the server, or vice versa.

To prevent a third-party from using fraudulently generated or forged SSL or TLS certificates, the server can "pin" a public key or a certificate authority. When a public key is pinned to a server, clients are informed to use only the pinned public key for communicating with the server. Other keys are implicitly assumed to be unauthorized. Pinning of public keys or certificates can be accomplished in several ways.

In a first example, the server creates a hash that uniquely identifies a public key to be used by clients for encrypting network traffic to the server. When a client receives a certificate purported to be issued to the server by a trusted certificate authority, the client can compare the public key specified in the certificate with the hash generated by the server. If the hash identifies the public key specified in the certificate, the client can determine that the certificate is valid and the public key is safe to use for encrypting communications with the server. However, if the hash fails to match the public key specified in the certificate, then the client can conclude that the certificate is forged or fraudulently issued. In order to prevent a third-party from also generating a hash value for the public key specified in the forged or fraudulently generated certificate, the client can be configured to access the hash through a second communications channel.

In some instances, the client can include a preinstalled list of hashes corresponding to public keys for specific servers or domains. For example, a web browser could be packaged with a list of hashes for the public keys used by specific servers or domains. However, such an approach can be difficult to scale to a large number of websites or domains, as a web browser would be required to include a hash for the public key of every website that a user is likely to or could potentially visit. Another example of a problem of scale with this approach is that other applications can be unable to access the list of hashes stored by the browser, forcing each application to maintain its own potentially duplicate list of hashes.

In other instances, the client can be configured to request hashes from a trusted SSL pinning service. For example, the client would first receive a copy of an SSL or TLS certificate from a web server. The client would then request a hash from the SSL pinning service. Because the SSL pinning service has been previously verified, the client could trust that the hash provided by the SSL pinning service will identify a valid public key for use with the web server. The client can then compare the hash provided by the SSL pinning service to the public key specified in the SSL or TLS certificate provided by the web server. If the hash matches the public key, then the client could determine that the public key is valid and that the certificate had not been forged or otherwise fraudulently generated.

Moreover, use of an SSL pinning service addresses a number of problems of scale that are associated with other approaches. For example, instead of maintaining a separate list of hashes and servers for each application installed on each client device, a single list of hashes can be maintained on the SSL pinning service. As another example, updates to the list of hashes can be quickly propagated. Instead of having to manually install updated hashes on every client device, the list of hashes on the SSL pinning service can be updated and the update will be sent to the client the next time the client device requests the hash for a particular server.

In a second example, a first copy of the public key provided by the server is directly compared to a second copy of the public key that the client has retrieved from an SSL pinning service. If the two public keys match, then the client can conclude that the public key provided by server is valid and that the client can use it to encrypt network communications with server. However, in some instances the second copy of the public key could be preinstalled on the client device (e.g., bundled with a browser or similar client application).

Depending on the requirements of a specific implementation, one of these two approaches may be chosen over the other. Comparison of hashes tends to be quicker because the size of the hash value is generally significantly less than the size of the corresponding public key. For example, a 4,096-bit public key could have a corresponding 128-bit hash. Accordingly, comparing the hashes would be quicker than comparing the public keys themselves and storing the hashes would be more space efficient than storing the public keys. However, it's possible that two different 4,096-bit public keys could have the same corresponding 128-bit hash (i.e., a hash collision). Therefore, in implementations where accuracy is preferred over speed, copies of the public keys can be directly compared instead of hashes of the public keys.

FIG. 1 is a schematic block diagram depicting a networked environment 100 according to various examples. The networked environment 100 includes a private computing environment 103, a public computing environment 106, and a client device 109. The private computing environment 103 and the client device 109 are in data communication with each other over a private network 113. The private network 113 may, in some instances, be connected to the larger Internet 116. In these instances, the client device 109 or the private computing environment 103 can be in data communication with the public computing environment 106 via the Internet 116. However, in other instances the private network 113 can remain unconnected to the Internet 116. For example, highly secure networks can be unconnected to the Internet 116 to prevent attacks on the private network 113 from the Internet 116 or to prevent confidential data from being sent to a third-party via the Internet 116 (e.g., "air-gapped" networks).

The private network 113 represents a network that is only accessible to authorized computing devices. The private network 113, for example, can correspond to the internal network of an organization or enterprise. Accordingly, the private network 113 can include local area networks (LANs), virtual LANs (VLANs), private leased lines connecting two or more LANs or VLANS to create a larger LAN or VLAN, virtual private network tunnels across a public network (e.g., the Internet 116) to connect two or more LANS or VLANS to create a larger LAN or VLAN. The private network 113 can also include one or more wired networks, one or more wireless networks, or a combination of wired and wireless networks. Access can be physically limited, limited to authenticated users, or limited via other mechanisms. For example, access to the private network 113 can be physically limited by virtue of the computing device being physically attached to the private network 113 or wirelessly connected to an access point for the private network. As another example, access to the private network 113 can be limited to users with the appropriate authentication credentials (e.g., a username and password for connecting remotely via a virtual private network tunnel).

The Internet 116 represents a global system of interconnected computer networks. Accordingly, the Internet 116 corresponds to a network of networks. Computing devices or networks connected to the Internet 116 can be accessed by other computing devices or networks connected to the Internet 116. Due to the sheer number of devices and networks connected to the Internet 116 and the nature of the interconnection, any computing device or network connected to the Internet 116 is, in a sense, publicly accessible by any of the other devices or networks connected to the Internet 116.

The private computing environment 103 and the public computing environment 106 can include a server computer or any other system providing computing capability. Alternatively, the private computing environment 103 and the public computing environment 106 can employ a plurality of computing devices that can be arranged in one or more server banks, computer banks, or other arrangements. The computing devices can be located in a single installation or can be distributed among many different geographical locations. For example, the private computing environment 103 and the public computing environment 106 can include a plurality of computing devices that together include a hosted computing resource, a grid computing resource, or any other distributed computing arrangement. In some cases, the private computing environment 103 and the public computing environment 106 can correspond to an elastic computing resource where the allotted capacity of processing, network, storage, or other computing-related resources that vary over time.

Various applications or other functionality can be executed in the private computing environment 103. The components executed on the private computing environment 103 can include a management service 119, a management console 123, a trust service 126, and a private SSL pinning service 129. However, other applications, services, processes, systems, engines, or functionality can be provided by the private computing environment 103. In some instances, the management service 119, the management console 123, the trust service 126, and the private SSL pinning service 129 can be executed on separate servers or similar computing devices within the private computing environment 103. Similarly, the management service 119, the management console 123, the trust service 126, and the private SSL pinning service 129 can be hosted on virtual machines executing on one or more physical servers within the private computing environment 103. However, in some instances, one or more of the management service 119, the management console 123, the trust service 126, and the private SSL pinning service 129 can be executed as individual services or applications hosted by the same server or virtual machine within the private computing environment 103.

The management service 119 can administer the operation of client devices 109 registered or otherwise enrolled with the management service 119. To this end, the management service 119 can also provide mechanisms for a client device 109 to enroll or otherwise register with the management service 119. As part of the enrollment process, a secure connection can be created or established between the management service 119 and a client device 109 using a version of the SSL or TLS protocol. The management service 119 can also enforce or otherwise require particular applications to be installed on an enrolled client device 109, require the client device 109 to be configured in a particular manner, or require that particular features be enabled or disabled on the client device 109.

The management console 123 can provide an administrative interface for configuring the operation of the management service 119, the trust service 126, the private SSL pinning service 129 and the configuration of client devices 109 that are administered by the management service 119. Accordingly, the management console 123 can correspond to a web page or web application provided by a web server hosted in the enterprise computing environment 103. For example, the management console 123 can be used to configure the trust service 126 with a specific certificate or public key. The management console 123 can also be used provide the pinning service URL 131 to the trust service 126. Further, the management console 123 can be used to configure the trust service 126 to instruct client devices 109 to use the private SSL pinning service 129 instead of a public SSL pinning service 133 or vice versa. Similarly, the management console 123 can be used to configure the trust service 126 to instruct client devices 109 not to use any SSL pinning services.

The trust service 126 can verify the identity of the private SSL pinning service 129. In response to a request from a client device, the trust service 126 can be executed to provide a location of the private SSL pinning service 129 (e.g., a uniform resource locator (URL) 131, an internet protocol (IP) address, or other location identifier) and a public key for the private SSL pinning service 129. In some alternative implementations, the trust service 126 can be executed to instead instruct a client device not to use an SSL pinning service like the private SSL pinning service 129 or a public SSL pinning service 133.

The private SSL pinning service 129 can be executed to provide information to be used by the client device 109 to determine that a server key 139 has been pinned to a particular computing device. The private SSL pinning service 129 can accomplish this in a number of ways.

In a first example, the private SSL pinning service 129 can provide hashes 136 for server keys 139 in response to requests from client devices 109. For example, a client device 109 can provide a copy of or an identifier of a server key 139 to the private SSL pinning service 129. In response to receiving server key 139, the SSL pinning service 129 can provide the hash 136 of the server key 139 to the client device 109.

In an alternative example, a client device 109 can provide a copy of the server key 139 and a copy of a hash 136 that the client device 109 computed for the server key 139. The private SSL pinning service 129 can then be executed to compare the hash 136 computed by the client device 109 with a copy of the hash 136 available to the private SSL pinning service 129. If the two hashes match 136, the private SSL pinning service 129 can respond to the client device 109 that the server key 139 is valid. If the two hashes 136 fail to match, the private SSL pinning service 129 can respond to the client device 109 that the server key 139 that had been provided to the client device 109 has been is invalid (e.g., forged, fraudulently generated, or otherwise invalid).

In a third example, the private SSL pinning service 129 can provide a copy of the server key 139 for a server in response to requests from client devices 109. For example, a client device 109 can provide an identifier for a particular server or service. In response, the private SSL pinning service 129 can provide copies of one or more pinned server keys 139 to the client device 109. The client device 109 could then compare a copy of a server key 139 received from the server to the copy of the server key 139 received from the private SSL pinning service 129 to validate or authenticate the server key 139 of the server.

Various data is stored in a private data store 141 that is accessible to the private computing environment 103. The private data store 141 can include one or more relational databases or non-relational databases (e.g., hierarchical databases, key-value databases, object databases, files, or other non-relational databases). The data stored in the private data store 141 is associated with the operation of the various applications or functional entities discussed in this application.

The data stored in the private data store 141 includes a pinning service URL 131, a server key 139, and potentially other data. The pinning service URL 131 corresponds to location of the private SSL pinning service 129 on the private network 113. The server key 139 represents a public key which has been pinned to a specific computing device, such as a server. For each server key 139, a corresponding hash 136 can be stored. In some instances, each server key 139 and corresponding hash 136 can be stored as a key-value pair in the client data store 153.

Various applications or other functionality can be executed in the public computing environment 106. The components executed on the public computing environment 106 can include a public SSL pinning service 133. However, other applications, services, processes, systems, engines, or functionality can be provided by the public computing environment 106. In some instances, the public SSL pinning service 133 can be executed on a dedicated server or similar computing device within the public computing environment 106. Similarly, the public SSL pinning service 133 can be hosted on one or more virtual machines executing on one or more physical servers within the public computing environment 106.

Various data can be stored in the public computing environment 106 in a public data store 143. The public data store 143 can include one or more relational databases or non-relational databases (e.g., hierarchical databases, key-value databases, object databases, files, or other non-relational databases). In various instances, a server key 139 can also be stored in the public data store 143. Each server key 139 can be associated with a corresponding hash 136 that can be used to validate the server key 139.

The client device 109 is representative of one or more client devices 109 that can be coupled to the private network 113. The client device 109 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, a wearable computing device, an augmented reality or virtual reality device, or another device with like capability.

The client device 109 can execute various applications, including a client application 146, a management agent 149, and potentially other applications. The client application 146 corresponds to any locally installed application executable by the client device 109. For example, the client application 146 could correspond to a web browser, an email client, a messaging or chat client, a document viewer, a file browser, a calendar application, a voice communications application, a video communications application, social media applications, a media player or media streaming application, or other applications.

The management agent 149 can maintain data communication with the management service 119 in order to perform various actions on the client device 109 in response to instructions received from the management service 119. In some instances, the management agent 149 includes a separate application executing on the client device 109. In other instances, the management agent 149 includes a mobile device management (MDM) framework provided by or included in the operating system installed on the client device 109. The management agent 149 can be configured to communicate with the management service 119 to enroll or otherwise register the client device 109 with the management service 119. The management agent 149 can also be configured to contact the management service 119 at periodic intervals and request that the management service 119 send any commands or instructions to the management agent 149. The management agent 149 can then cause the client device 109 to perform the commands provided by the management service 119.

Various data can be stored on the client device 109 in a client data store 153. The client data store 153 can include one or more relational databases or non-relational databases (e.g., hierarchical databases, key-value databases, object databases, files, or other non-relational databases). In various instances, a preinstalled certificate 156 can be stored in the client data store 109. The preinstalled certificate 156 can be used by the management agent 149 to validate or verify the identity of the trust service 126, as further described herein. The preinstalled certificate 156 can, in some instances, be installed alongside the management agent 149 or otherwise bundled with the management agent 149. In other instances, the preinstalled certificate 156 can be provided by the vendor that distributed the operating system for the client device 109. In these instances, the preinstalled certificate 156 can be included by default in a certificate store or similar storage provided by the operating system of the client device 109, in which case the client data store 153 can correspond to the operating system provided certificate store.

Next, a general description of the operation of the various components of the networked environment 100 is provided. The various components of the networked environment 100 can operate in several ways. Several of the potential configurations are detailed in the following discussion.

To begin, the management agent 149 can contact the management service 119 to register or otherwise enroll the client device 109. For example, to enroll a client device 109, the management agent 149 can connect to the management service 119 to provide information about the client device 109. The information could include the make, model, and type of the client device 109 (e.g., an APPLE® IPHONE6S® or other mobile device), the identity of the user of the client device 109 (e.g., a username) and other information. This information can then be used by the management service 119 to determine which policies to select for enforcement on the client device 109 (e.g., usage restrictions, installation of approved applications, removal of unapproved applications, values for security settings, etc.) As part of the connection process, the management service 119 can provide an SSL or TLS certificate to the management agent 149 to use to encrypt communications with management service 119. The certificate can include a server key 139. The management service 119 can also provide the network location of a trust service 126 that the management agent 149 can use to validate the public key provided by the management service 119.

To verify the server key 139 provided by the management service 119, the management agent 149 can then contact the trust service 126 identified by the management service 119. The management agent 149 can first verify the identity of the trust service 126 by checking to see if the public key or SSL/TLS certificate provided by the trust service 126 has been previously signed with a copy of the preinstalled certificate 156. If the public key or SSL/TLS certificate used by the trust service 126 has been signed using the preinstalled certificate 156, then the management agent 149 can determine that it is authorized to communicate with the trust service 126.

For example, the trust service 126 and management agent 149 could have been developed or deployed by the same entity. Accordingly, that entity would have the ability to cryptographically sign the certificate or server key 139 used by the trust service 126 with the preinstalled certificate 156 to generate a corresponding cryptographic signature. The entity could then bundle the preinstalled certificate 156 in an installer for the management agent 149. Accordingly, when the management agent 149 is installed, the preinstalled certificate 156 would also be loaded onto the client device 109. This provides the management agent 149 with access to the preinstalled certificate 156 prior to connecting to the trust service 126.

After verifying that the trust service 126 is using a server key 139 that has been signed by the preinstalled certificate 156, the management agent 149 can then query the trust service 126 for the SSL or TLS pinning settings for the private network 113. For example, the trust service 126 could provide the management agent 149 with the network location for the private SSL pinning service 129. The network location could correspond to an IP address or a pinning service URL 131. In this example, the trust service 126 could also provide a hash 136 for the corresponding server key 139 used by the private SSL pinning service 129. However, in some instances, the trust service 126 could provide a copy of the server key 139 itself for the private SSL pinning service 129. As another example, the trust service 126 could inform the management agent 149 that no private SSL pinning service 129 is configured on the private computing environment 103. In this example, the trust service 126 could further indicate that the client device 109 should not use any SSL pinning services or that the client device 109 should use a public SSL pinning service 133 (e.g., an SSL pinning service provided by the entity or vendor that distributed the management agent 149 and that is publicly accessible to any client device 109 able to establish a connection to the Internet 116).

Assuming that the management agent 149 has received a pinning service URL 131 (or similar network location) and either a hash 136 for the server key 139 of the private SSL pinning service 129 or the server key 139 itself, the management agent 149 can then request that the private SSL pinning service 129 confirm the validity of the server key 139 initially provided by the management service 119. In one example, the management agent 149 can send an identifier for the server key 139, an identifier of the management service 119, or a copy of the server key 139 for the management service 119 to the private SSL pinning service 129. The private SSL pinning service 129 could then provide either a hash 136 for the server key 139 to the management agent 149 or the server key 139 itself. The management agent 149 could then either compare the received hash 136 to a hash 136 generated by the management agent 149 or could compare the received copy of the server key 139 to a copy of the server key 139 provided by the management service 119. If hash 136 generated by the management agent 149 matches the hash 136 provided by the private SSL pinning service 129 or the server key 139 provided by the management service 119 matches the copy of the server key 139 provided by the private SSL pinning service 129, then the management agent 149 could determine that the server key 139 provided by the management service 119 is valid. In another example, the management agent 149 could supply a hash 136 for the server key 139 to the private SSL pinning service 129 in addition to a copy of or identifier for the server key 139. The private SSL pinning service 129 can then determine that the hash 136 calculated by the management agent 149 matches a hash 136 stored by the private SSL pinning service 129. If the two hashes 136 match, then the private SSL pinning service 129 would reply to the management agent 149 that the server key 139 for the management service 119 is valid. If the two hashes 136 fail to match, then the private SSL pinning service 129 would reply to the management agent 149 that the server key 139 provided by the management service 119 was invalid (e.g., a forgery, fraudulently issued, unauthorized, or otherwise invalid).

Assuming that the SSL or TLS certificate presented by the management service 119 is confirmed to be valid by the private SSL pinning service 129, the management agent 149 can then continue to communicate with the management service 119 in order to complete the enrollment or registration process. For example, the management agent 149 could wait until the validity of the SSL or TLS certificate of the management service 119 before transmitting sensitive or confidential data as part of the device enrollment or registration process (e.g., user names, passwords, or similar authentication credentials). In addition, other applications, such a client application 146, executing on the client device 109 can be configured to use the private SSL pinning service 129 after the management agent 149 has identified the private SSL pinning service 129.

Figure 2:
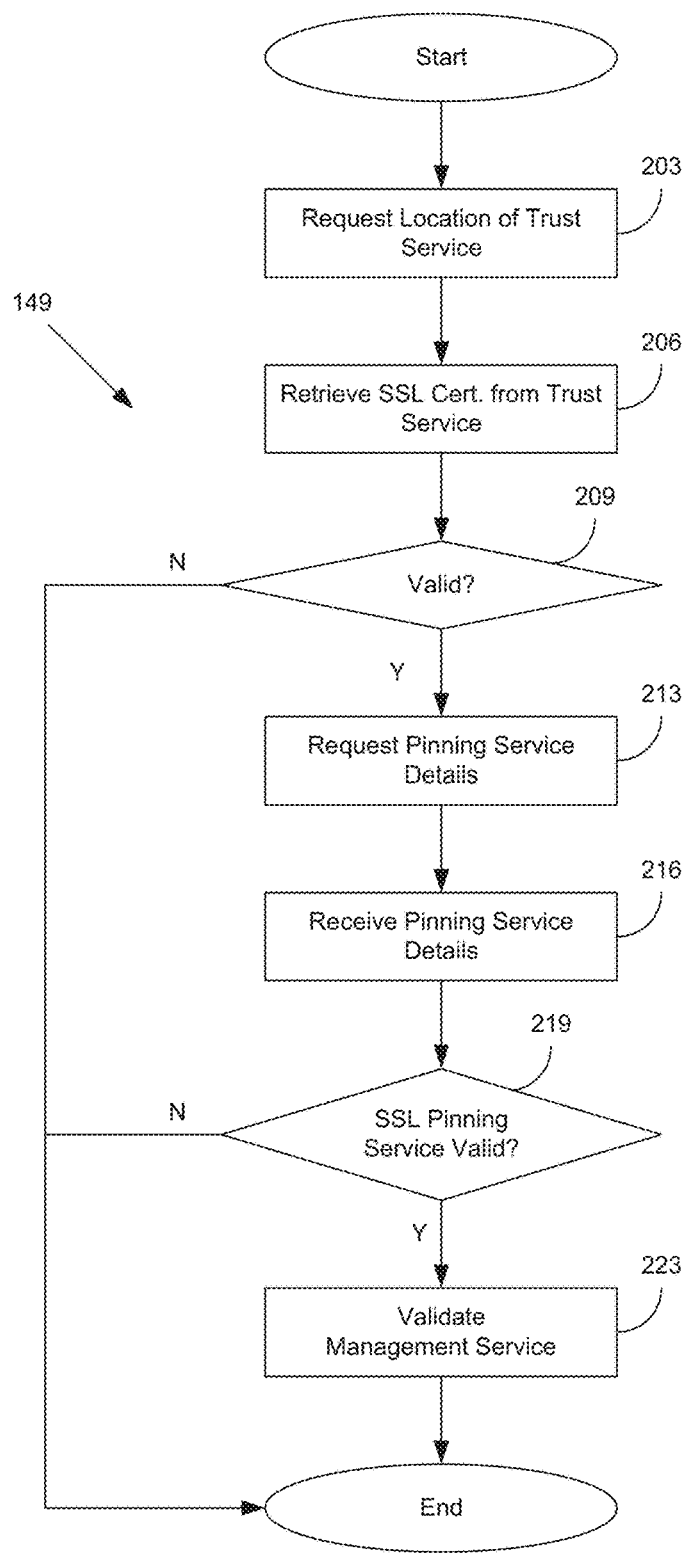
FIG. 2 is a flowchart depicting the functionality of a client application executing within the example networked environment.

FIG. 2 is a flowchart depicting the operation of various portions of the management agent 149. As an alternative, the flowchart of FIG. 2 can be viewed as depicting an example of elements of a method implemented in the client device 109.

Beginning with step 203, the management agent 149 requests the location of the trust service 126 from the management service 119. This request can occur as part of an initial communication with the management service 119 to enroll or register the client device 109 with the management service 119. For example, when initially attempting to communicate with the management service 119, the management agent 149 can request from the location of the trust service 126 in order to begin the process of validating the server key 139 provided by the management service 119 for encrypting communications between the management service 119 and the management agent 149 using a version of the SSL or TLS protocol.

Proceeding with step 206, the management agent 149 retrieves an SSL certificate or TLS certificate from the trust service 126 and a corresponding cryptographic signature. In some implementations, however, the management agent 149 can instead request just the server key 139 for encrypting communications with the trust service 126. In either case, the management agent 149 can issue a request to the trust service 126 and receive either a certificate or a server key 139 in response.

Moving on to step 209, the management agent 149 can validate the certificate or server key 139 provided by the trust service 126 to determine whether management agent 149 is authorized to communicate with the trust service 126. To validate the trust service 126, the management agent 149 can compare a cryptographic signature of the certificate or server key 139 provided by the trust service 126 to cryptographic signature generated by the management agent 149 using a preinstalled certificate 156. If the cryptographic signature provided by the trust service 126 matches the cryptographic signature computed by the management agent 149, then the management agent 149 can determine that the certificate or server key 139 provided by the trust service 126 is valid. If the cryptographic signatures match and the certificate or server key 139 is determined to be valid, then the process can proceed to step 213. Otherwise, the process ends.

Referring next to step 213, the management agent 149 can send a request to the trust service 126 for details of an SSL pinning service to use to validate server keys 139 of other servers or services. Because the trust service 126 has been previously validated, the management agent 149 can rely on the assertion of the trust service 126 that any specified SSL pinning service can be used by the management agent 149.

Proceeding to step 216, the management agent 149 can receive one of several responses from the trust service 126. In a first example, the management agent 149 could receive a response that no SSL pinning service is to be used. For example, on a private network 113 unconnected to the Internet 116, a public SSL pinning service 133 would be unavailable and a private SSL pinning service 129 might be unnecessary due to a lower risk of MITM attacks or other network attacks that would attempt to intercept and decrypt network traffic. In this case, the management agent 149 would be able to implicitly trust any server keys 139 it received from any server or service connected to the private network 113. In a second example, the management agent 149 could receive a response that the management agent 149 is to use a private SSL pinning service 129. In this example, the management agent 149 would receive a network location for the private SSL pinning service 129, such as an IP address or a pinning service URL 131, and either a hash 136 for a server key 139 used by the private SSL pinning service 129 or a copy of the server key 139 itself, depending on the implementation. In a third example, the management agent 149 could receive a response that the management agent 149 is to use a public SSL pinning service 133 (e.g., an SSL pinning service maintained by the vendor that developed and provided the trust service 126, management service 119, and management agent 149 to the enterprise).

Moving on to step 219, the management agent 149 can validate the SSL pinning service details provided by the trust service 126. If the management agent 149 were instructed not to use an SSL pinning service, then the process can proceed to step 223. However, if the trust service 126 specified that the management agent 149 use a private SSL pinning service 129, then the management agent 149 could send a request to the private SSL pinning service 129 for its server key 139. The management agent 149 could then compute a hash 136 of the server key 139 of the private SSL pinning service 129 and compare it to the hash 136 provided by the trust service 126. If the hashes 136 match, then the management agent 149 could conclude that connection to the private SSL pinning service 129 was secure and that the management agent 149 was communicating with the correct SSL pinning service rather than an imposter (e.g., due to a MITM attack). Similarly, the management agent 149 could compare a copy of the server key 139 for the private SSL pinning service 129 that was provided by the trust service 126 to a copy of the server key 139 used by the private SSL pinning service 129. The process would then proceed to step 223. However, if the hashes 136 fail to match, then the process would end.

Likewise, if the trust service 126 specified that the management agent 149 use a public SSL pinning service 133, then the management agent 149 could send a request to the public SSL pinning service 133 for its server key 139. The management agent 149 could then determine whether the server key 139 provided by the public SSL pinning service had been signed by the preinstalled certificate 156. If the server key 139 for the public SSL pinning service 133 had been signed by the preinstalled certificate 156, then the management agent 149 could conclude that connection to the public SSL pinning service 133 was secure and that the management agent 149 was communicating with the correct SSL pinning service rather than an imposter (e.g., due to a MITM attack). The process would likewise proceed to step 223. However, if the server key 139 provided by the public SSL pinning service 133 had not been signed with the preinstalled certificate 156, then the process would end.

Referring next to step 223, the management agent 149 can validate the management service 119. This could be performed in several ways. Further, the process could be the same or substantially similar when either a public SSL pinning service 133 or a private SSL pinning service 129 is used. After validation of the management service 119 occurs, the process will end.

As a first example, the management agent 149 could request that the private SSL pinning service 129 provide a hash 136 for the corresponding server key 139 used by the management service 119. The management agent 149 could then compute a hash 136 for the server key 139 provided by the management service 119 and compare that hash 136 to the hash 136 provided by the private SSL pinning service 129. If the hashes 136 match, the management agent 149 can determine that the server key 139 used by the management service 119 is authentic and that communications between the management service 119 and the management agent 149 can be safely encrypted.

As a second example, the management agent 149 could request that the private SSL pinning service 129 provide a copy of the server key 139 for the management service 119. The management agent 149 could then compare the copy of the server key 139 provided by the private SSL pinning service 129 to the server key 139 used by the management service 119. If the server keys 139 match, the management agent 149 can determine that the server key 139 used by the management service 119 is authentic and that communications between the management service 119 and the management agent 149 can be safely encrypted.

As a third example, the management agent 149 could compute a hash 136 for the server key 139 provided by the management service 119. The management agent 149 could then send the computed hash 136 and an identity of the server key 139 to the private SSL pinning service 129. The private SSL pinning service 129 could then compare the computed hash 136 to the hash 136 stored by the private SSL pinning service 129. If the two hashes 136 match, then the private SSL pinning service 129 could return a message indicating to the management agent 149 that the server key 139 for the management service 119 is authentic.

Figure 3:
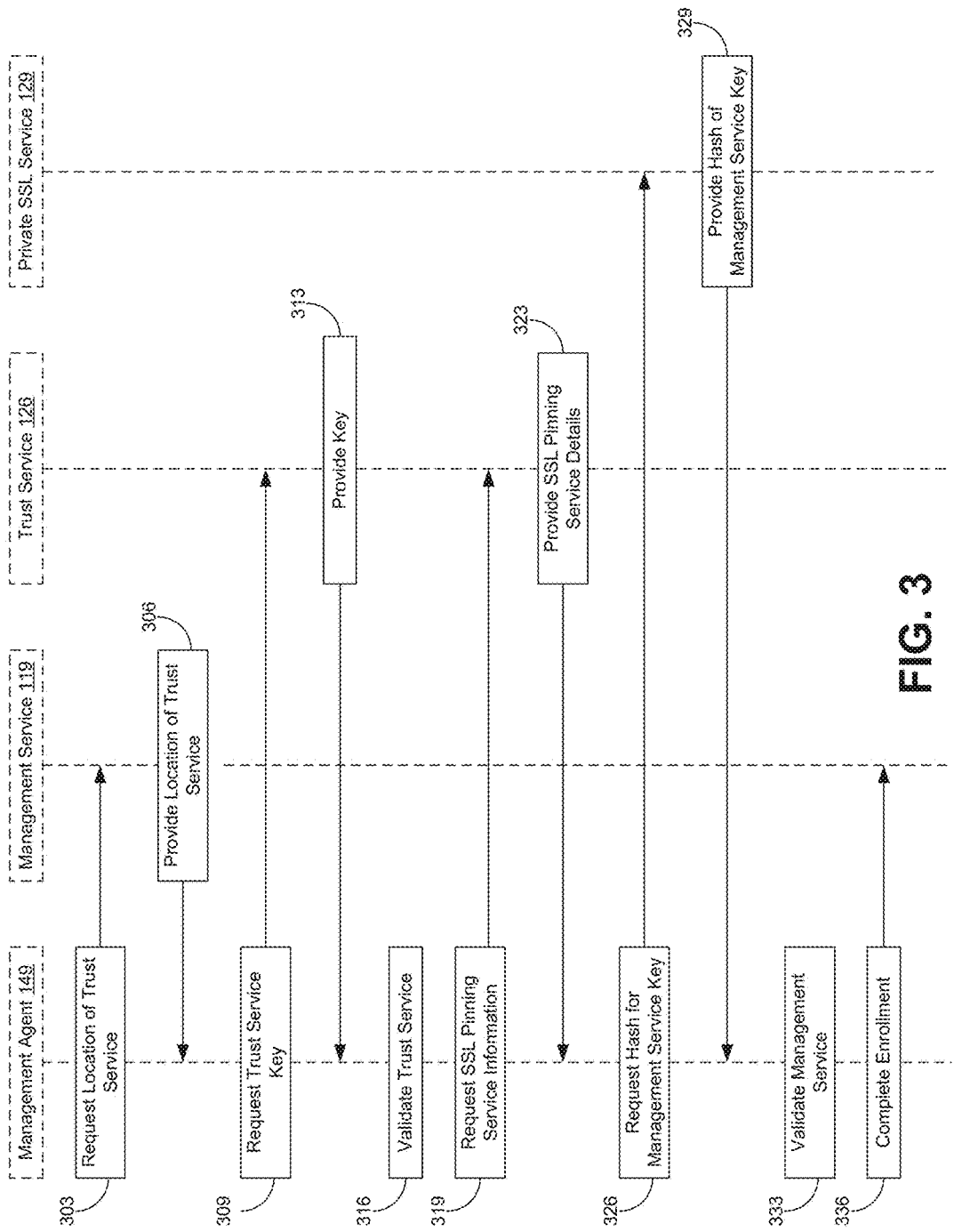
FIG. 3 is a sequence diagram depicting an example of the interactions between several applications or services implemented within the example networked environment.

Referring next to FIG. 3, shown is a sequence diagram that provides one example of the interaction of a various components of the network environment 100. For example, FIG. 3 depicts the interactions between a management agent 149, with a management service 119, a trust service 126, and an SSL pinning service such as the private SSL pinning service 129 or the public SSL pinning service 133.

Beginning with step 303, the management agent 149 can send a request to the management service 119 for the location of a trust service 126. The request can be sent as an initial part of an enrollment or registration process performed by the management agent 149 to validate or authenticate the identity of the management service 119 prior to the management agent 149 sending sensitive data to the management service 119.

Proceeding to step 306, the management service 119 can provide a location of a trust service 126. The location can be represented by a URL or IP address that specifies the location of the trust service 126 on the private network 113.

Moving on to step 309, the management agent 149 can send a request to the trust service 126 for a server key 139 used by the trust service 126. However, in some alternative implementations, the management agent 149 can instead send a request to the trust service 126 for a certificate used by the trust service 126.

Referring next to step 313, the trust service 126 can provide its server key 139 and a corresponding cryptographic signature in response to the request made at step 309. However, in alternative implementations where the management agent 149 requested a certificate, the trust service 126 can instead provide a certificate to the management agent 149 and a corresponding cryptographic signature for the certificate.

Proceeding to step 316, the management agent 149 can validate the trust service 126. For example, the management agent 149 can compare the cryptographic signature of the server key 139 of the trust service 126 with a cryptographic signature generated using a preinstalled certificate 156. If the cryptographic signatures match, then the management agent 149 can conclude that the trust service 126 has been deployed by the same entity that deployed the management agent 149. In examples where the trust service 126 provided a certificate instead of a server key 139, the management agent 149 can similarly compare a cryptographic signature for the certificate to a cryptographic signature computed by the management agent 149 using the preinstalled certificate 156 to verify the trust service 126.

After validating the trust service 126, the management agent 149 can request information from the trust service 126 necessary to communicate with the private SSL pinning service 129 at step 319. For example, the management agent 149 can request a pinning service URL 131 or similar network identifier and either a hash 136 for the server key 139 of the private SSL pinning service 129 or a copy of the server key 139 itself. The trust service 126 provides the requested information to the management agent 149 in response at step 323.

Proceeding to step 326, the management agent 149 can send a request to the private SSL pinning service 129 located at the pinning service URL 131 for either a hash 136 of the server key 139 previously provided by the management service 119 as part of the initial communication between the management agent 149 and the management service 119 or a copy of the server key 139 itself. In response at step 329, the private SSL pinning service 129 provides the requested hash 136 or server key 139 to the management agent 149.

In some instances, the management agent 149 can optionally verify the identity of the private SSL pinning service 129 at this stage. For example, the management agent 149 could compare a hash 136 of a server key 139 of the private SSL pinning service 129 to the hash 136 provided by the management service 119 previously at step 323. The hash 136 of the server key 139 of the private SSL pinning service 129 can have been provided by the private SSL pinning service 129 as part of the response at step 329 or can have been computed by the management agent 149 in response to receiving the server key 139 of the private SSL pinning service 129 to secure the communications between the management agent 149 and the private SSL pinning service 129.

Referring next to step 333, the management agent 149 can validate the management service 119. For example, the management agent 149 can compare a hash 136 of the server key 139 of the management service 119 to the hash 136 previously received from the private SSL pinning service 129 at step 329. The hash 136 of the server key 139 of the management service 119 could have been provided by the management service 119 or the hash 136 of the server key 139 of the management service 119 can have been computed by the management agent 149. If the two hashes 136 match, then the management agent 149 can conclude that the connection to the management service 119 is secure and that the management agent 149 is not attempting to communicate with an impostor management service 119. As another example, the management agent 149 could compare a copy of the server key 139 used by the management service 119 to the copy of the server key 139 provided by the private SSL pinning service 129. If the two server keys 139 match, then the management agent 149 can conclude that the connection to the management service 119 is secure and that the management agent 149 is not attempting to communicate with an impostor management service 119.

Proceeding to step 336, the management agent 149 completes enrollment of the client device 109. For example, the management agent 149 can send a user name, password, device identifier, or other information to the management service 119 to allow the management service 119 to authenticate the client device 109, track the client device 109, and identify which policies, if any, should be applied to or enforced on the client device 109.

The flowchart of FIG. 2 and sequence diagram of FIG. 3 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 2 and sequence diagram of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the private computing environment 103 and the public computing environment 106, as well as the client device 109, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 119, management console 123, trust service 126, private SSL pinning service 129, public SSL pinning service 133, client application 146, management agent 149, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
a first computing device comprising a processor and a memory;
an application comprising machine readable instructions stored in the memory that, when executed by the processor, cause the first computing device to at least:
request a first certificate from a trust service;
validate that the first certificate from the trust service is signed by a preinstalled certificate on the first computing device;
in response to transmitting a first request to the trust service, receive a uniform resource locator (URL) identifying a network location of a secure sockets layer (SSL) pinning service, wherein the SSL pinning service is configured to provide a hash value for a first public key issued to a second computing device;
receive a second public key from the trust service;
in response to transmitting a second request, receive the first public key from the SSL pinning service; and
validate a management service by comparing the first public key from the SSL pinning service to the second public key from the trust service, wherein the management service is executed on the second computing device and configured to manage an operation of the first computing device.

2. The system of claim 1, wherein the second request comprises an identifier for the second computing device, and the application further comprises machine readable instructions that cause the first computing device to at least:
receive from the SSL pinning service the hash value for the first public key issued to the second computing device.

3. The system of claim 2, wherein the second computing device comprises an enrollment server and the application further comprises machine readable instructions that cause the first computing device to at least send an enrollment request for the first computing device to the enrollment server.

4. The system of claim 1, wherein the first computing device, the trust service, and the SSL pinning service are connected to a local area network (LAN) that is unconnected to the Internet.

5. The system of claim 1, wherein:
the URL identifying the network location of the SSL pinning service comprises a second URL;
the application further comprises machine readable instructions that cause the first computing device to at least receive a first URL identifying the network location of the trust service; and
the application causes the first computing device to request the first certificate from the trust service based at least in part on receipt of the first URL identifying the network location of the trust service.

6. The system of claim 1, wherein the application further comprises machine readable instructions that cause the first computing device to initiate enrollment of the first computing device with the management service, wherein a respective request for the first certificate from the trust service is based at least in part on initiation of the enrollment of the first computing device with the management service.

7. The system of claim 1, wherein the preinstalled certificate is bundled with the application.

8. A method, comprising:
requesting, with a client device, a first certificate from a trust service;
validating, with the client device, that the first certificate from the trust service is signed by a preinstalled certificate stored on the client device;
in response to transmitting a first request to the trust service, receiving, with the client device, a uniform resource locator (URL) identifying a network location of a secure sockets layer (SSL) pinning service, wherein the SSL pinning service is configured to provide a hash value for a first public key issued to a computing device;
receiving, with the client device, a second public key from the trust service;
in response to transmitting a second request, receiving, with the client device, the first public key from the SSL pinning service; and
validating, with the client device, a management service by comparing the first public key to the second public key from the trust service, wherein the management service is executed on the computing device and configured to manage an operation of the client device.

9. The system of claim 1, wherein the first computing device, the trust service, and the SSL pinning service are connected to a local area network (LAN) on a private network that requires authorization in order for access.

10. The method of claim 8, wherein the second request comprises an identifier for the computing device, and further comprising:
receiving, with the client device, the hash value for the first public key issued to the computing device from the SSL pinning service.

11. The method of claim 8, further comprising sending an enrollment request for the client device to the computing device.

12. The method of claim 8, wherein the client device, the trust service, and the SSL pinning service are connected to a local area network (LAN) that is unconnected to the Internet.

13. The method of claim 8, wherein the URL identifying the network location of the SSL pinning service comprises a second URL and the method further comprises:

receiving, with the client device, a first URL identifying the network location of the trust service; and wherein requesting, with the client device, the first certificate from the trust service is based at least in part on receiving the first URL identifying the network location of the trust service.

14. The method of claim 8, further comprising initiating, with the client device, enrollment of the client device with a management service, wherein requesting the first certificate from the trust service is based at least in part on initiating the enrollment of the client device with the management service.

15. A non-transitory computer readable medium comprising machine readable instructions that, when executed by a processor of a first computing device, cause the first computing device to at least:

request a first certificate from a trust service;

validate that the first certificate from the trust service is signed by a preinstalled certificate on the first computing device;

in response to transmitting a first request to the trust service, receive a uniform resource locator (URL) identifying a network location of a secure sockets layer (SSL) pinning service, wherein the SSL pinning service is configured to provide a hash value for a first public key issued to a second computing device;

receive a second public key from the trust service;

in response to transmitting a second request, receive the first public key from the SSL pinning service; and validate a management service by comparing the first public key to the second public key from the trust service, wherein the management service is executed on the second computing device and configured to manage an operation of the first computing device.

16. The non-transitory computer readable medium of claim 15, wherein the second request comprises an identifier for the second computing device and further comprising machine readable instructions that cause the first computing device to at least:

receive from the SSL pinning service the hash value for the first public key issued to the second computing device.

17. The non-transitory computer readable medium of claim 15, wherein the second computing device comprises an enrollment server and further comprises machine readable instructions that cause the first computing device to at least send an enrollment request for the first computing device to the enrollment server.

18. The non-transitory computer readable medium of claim 15, wherein the first computing device, the trust service, and the SSL pinning service are connected to a local area network (LAN) that is unconnected to the Internet.

19. The non-transitory computer readable medium of claim 15, wherein the URL identifying the network location of the SSL pinning service comprises a second URL and further comprising machine readable instructions that cause the first computing device to at least receive a first URL identifying the network location of the trust service, and wherein the machine readable instructions cause the first computing device to request the first certificate from the trust service based at least in part on receipt of the first URL identifying the network location of the trust service.

20. The non-transitory computer readable medium of claim 15, further comprising machine readable instructions that cause the first computing device to at least initiate enrollment of the first computing device with a management service, wherein the request for the first certificate from the trust service is based at least in part on initiation of the enrollment of the first computing device with the management service.

* * * * *